United States Patent [19]
Yoshizawa et al.

[11] Patent Number: 5,746,384
[45] Date of Patent: May 5, 1998

[54] TAPE TENSION CONTROL APPARATUS

[75] Inventors: Masaki Yoshizawa, Saitama; Takanobu Kohno, Tokyo; Satoshi Ota, Chiba, all of Japan

[73] Assignee: Sony Corporation, Tokyo, Japan

[21] Appl. No.: 911,569

[22] Filed: Aug. 14, 1997

Related U.S. Application Data

[63] Continuation of Ser. No. 583,956, Jan. 11, 1996, abandoned, which is a continuation of Ser. No. 149,088, Nov. 9, 1993, abandoned.

[30] Foreign Application Priority Data

| Nov. 9, 1992 | [JP] | Japan | 4-298505 |
| Nov. 9, 1992 | [JP] | Japan | 4-298511 |
| Nov. 11, 1992 | [JP] | Japan | 4-300875 |

[51] Int. Cl.$^6$ .......................... B65H 59/38; G11B 15/46
[52] U.S. Cl. ..................... 242/334.4; 242/334.3; 360/73.01
[58] Field of Search .................. 242/334.3, 334.4, 242/334.5; 360/73.14, 73.01

[56] References Cited

U.S. PATENT DOCUMENTS

| 3,761,035 | 9/1973 | Wang | 242/334.5 X |
| 5,259,563 | 11/1993 | Kakiwaki et al. | 242/334.5 X |

Primary Examiner—John Q. Nguyen
Attorney, Agent, or Firm—Jay H. Maioli

[57] ABSTRACT

A tape tension control apparatus for controlling tape tension by supplying a current to a reel motor for driving a reel in accordance with a diameter of a tape roll includes: a rotational speed detect or for detecting the rotational speed of the tape roll; a rotational speed comparator for comparing a rotational speed detected by the rotational speed detector and a standard rotational speed corresponding to the diameter of the tape roll; and a current correct or for correcting the value of the current supplied to the reel motor in accordance with a comparison result from the rotational speed comparator in such a manner that the speed of rotation of the reel motor becomes equal to the standard rotational speed.

1 Claim, 9 Drawing Sheets

TAPE TENSION CONTROL APPARATUS

This a continuation of application Ser. No. 08/583,956 filed Jan. 11, 1996, abandoned which is a Continuation of Ser. No. 08/149,088 filed Nov. 9, 1993, abandoned.

BACKGROUND OF THE INVENTION

1. Field of the Invention

The present invention relates to a video tape recorder (VTR) with reel driving apparatus.

2. Description of the Related Art

FIG. 1 is a view of an example of a conventional tape transport system with a tape loaded. In this diagram, the numeral 1 indicates the supply reel, numeral 2 indicates the take reel, numeral 3 indicates the reel motor, numeral 4 indicates the gear for transmitting the driving power of the reel 3 to the reels 1 and 2, numeral 5 indicates the drum, numeral 6 indicates the capstan, numeral 7 indicates the pinch roller and numeral 8 indicates the tape. The take reel 2 has a torque limiter which is between the drive source and the drive destination which makes use of, for example, friction, so as to prevent the tension F of the tape 8 from being excessive. When the tape 8 is moving forward (FWD), by rotating the reel motor 3 in the clockwise direction, the gear 4 will interlock with the take reel 2 so as to make it rotate in the clockwise direction. On the other hand, when the tape is moving in the reverse (RVS) direction, by rotating the reel motor 3 in the anti-clockwise (CCW) direction, the reel 4 will interlock with the supply reel 1 and the reel 2 will rotate in the anti-clockwise direction.

So, by maintaining a constant tape tension F at the part of the tape P when the tape is in transit, an output can be obtained from the desired head, tape damage such as that caused by the tape guides can be removed so that the reliability of the tape path can be increased.

Conventionally, in order to maintain a constant tape tension F, a mechanical tape tension regulator for controlling the tape tension was used with the forward (FWD) system and control of the tape tension in the reverse (RVS) system was carried out using a current servo system for controlling the current flowing to reel motor 3 which drives the reels in such a manner that it corresponds to the diameter of the tape roll.

As it is known, there is a directly proportional relationship between the current I flowing to the reel motor 3 and the torque generated by the motor, such that the equation 1 can be obtained using the tape roll diameter R, the tape tension F and the torque generated by the reels $T_r$. Equation 1

$$I \times \mu \times T_r = F \times R$$

The following equation 2 can then be obtained by taking into account the mechanical loss and the electrical loss. Here, K1, K2, A and B are constants where $A=K1 \times F$ and $B=K2$. Mechanical losses include losses such as those at the reel motor, losses at the gear 4 in transmitting the driving power from the reel motor to the reels 1 and 2 and losses the reels 1 and 2, while electrical losses include errors such as those generated by errors at the current detection circuit.

$$\begin{aligned} I &= K1 \times F \times R + K2 \qquad \text{Equation 2}\\ &= A \times R + B \end{aligned}$$

As becomes apparent from equation 2, the tape tension may be held constant by changing the motor current in accordance with the diameter R of the tape roll. This tape roll diameter R can be obtained from the rotational period of the reels and the tape speed, as is disclosed in Japanese Publication No. SHO 58-17992. Equation 3 can be obtained using the tape roll diameter of the supply reel RS, the rotational period of the supply reel TS, the diameter of the tape roll on the take reel RT, the rotational period of the take reel TT, the tape speed V and the overall area of the tape 8 and the reel hub AA. Although this will not be explained in detail, in the equation for the relationship between these items if the rotational periods of the reel TS and TT, and the speed V are known, the diameters of the tape rolls RS and RT can be calculated.

Equation 3

$$AA = \pi RS^2 + \pi RT^2$$

$$V = 2\pi RS/TS$$

$$V = 2\pi RT/TT$$

FIG. 2 is a view of the tape tension control apparatus for providing control in such a manner that the tape tension F is kept constant by controlling a current I flowing to the reel motor 3 for driving the reel 1 in the reverse system so as to correspond to the tape roll diameter R.

In FIG. 2, the numeral 11 indicates a microcomputer which is supplied with frequency signals SFG and TFG from a frequency generator (not shown in the diagram) attached between the supply reel 1 and the take reel 2, along with a frequency signal CFG provided from a signal generator (not shown in the diagram) attached to the capstan 6. The microcomputer 11 then obtains the rotational periods TS and TT of the reels from the frequency signals SFG and TFG, the tape speed V is obtained from the frequency signal CFG, and the diameters RS and RT of the tape rolls are calculated.

At the microcomputer 11, the tape roll diameter RS of the supply roll 1 is used as the tape roll diameter R and a current I corresponding to this tape roll diameter R is obtained. This calculated value is then sent to the PWM circuit 12 inside the microcomputer 11 as the control signal SCi. A PWM signal corresponding to the control signal SCi is then outputted from the PWM circuit 12 to be smoothed by a low pass filter 13 before being sent to the fixed current drive circuit 14. In this way, a current I which corresponds to the tape roll diameter R can be sent to the reel motor 15 which drives the reel 1 and the tape tension F can be kept constant.

If the system is almost ideal, simply by controlling the current I flowing to the reel motor 15 so as to be in accordance with the diameter R of the tape roll as in the example in FIG. 2, the tape tension F can be held stable.

There are, however, fluctuations in the reeling in speed of the supply reel 1 due to changes in the load on the drive systems for items such as the reel motor 15 and external disturbances and these may cause fluctuations in the tape tension F or drooping in the tape 8.

Also, if the tape tension F is controlled just by controlling the current I flowing to the reel motor 15 as in the example in FIG. 2, if the tape then sags during transport the rotational speed will be increased as the load on the reel motor 15 is small and the tape 8 will be reeled in a jerking movement. As the sagging in the tape will then have been removed, excessive transit tension will then be instantly applied to the tape 8.

While keeping the tape tension F constant by having a current I which is deduced from equation 2 and corresponds to the diameter of the tape roll R flowing to the reel motor 15, if there are mechanical losses such as losses at the reels 1 and 2, losses at the reel motor 15 or losses at the gear 4, or if there is torque loss, so that there are changes with time the tape tension F will no longer be controlled so as to be constant, i.e. if the tape tension F becomes small when the torque loss increases it will no longer be possible to obtain an output from the desired head. Alternatively, if the tape tension F becomes large when the torque loss is reduced tape damage caused by, for example, the tape guides, will occur.

A ROM look-up table is usually used by the microcomputer 11 to obtain a current I corresponding to the diameter R of the tape roll, i.e. the tape roll diameter R and the tape speed V are taken as input addresses for the ROM and the current I is then obtained by this ROM using the approximation equation 2.

In this case, since average values are used for the constants A and B in the approximation equation 2, fluctuations will occur for each setting for controlling the tape tension. A ROM having a large storage capacity is also required in order to store the tape roll diameters R and the tape speeds V as input parameters.

SUMMARY OF THE INVENTION

It is therefore a first object of this invention to control the fluctuations in the take-up speeds of the reel and to prevent fluctuations in the tape tension and tape sags. In this way, an excessive transit tension will not be exerted on the tape even if the tape sags during transit.

A second object of this invention is to provide a reel driving apparatus which can recognize abnormalities due to changes in the torque loss with time and to obtain a VTR in which inconveniences caused by, for example, torque loss abnormalities can be avoided.

It is a third object of this invention to provide a tape tension control apparatus for which fluctuations for each setting can be corrected so that the tape tension can be kept constant and where a ROM having a large storage capacity is no longer necessary.

In order to achieve these objects, in the present invention a tape tension control apparatus for controlling the fixing of tape tension by supplying a current to a reel motor for driving a reel in accordance with a diameter of a tape roll comprises rotational speed detecting means for detecting the rotational speed of the tape roll, rotational speed comparing means for comparing a rotational speed detected by the rotational speed detecting means and a standard rotational speed corresponding to the diameter of the tape roll and current correcting means for correcting the value of the current supplied to the reel motor in accordance with a comparison result from the rotational speed comparing means in such a manner that the speed of rotation of the reel motor becomes equal to the standard rotational speed.

Also, in the present invention a reel driving apparatus comprises current detecting means for detecting a current which is flowing in such a manner as to be driving a reel motor for driving a reel which has no tape installed at a constant rotational speed and torque determining means for determining abnormality in a torque loss by deciding whether the current detected by the current detecting means is within a predetermined range or not.

Further, in the present invention, a VTR installed with a reel driving apparatus further comprises operation prohibiting means for prohibiting operations such as recording and playback when the torque determining means; determines the torque loss to be abnormal.

DETAILED DESCRIPTION OF THE PREFERRED EMBODIMENTS

Figure 2:
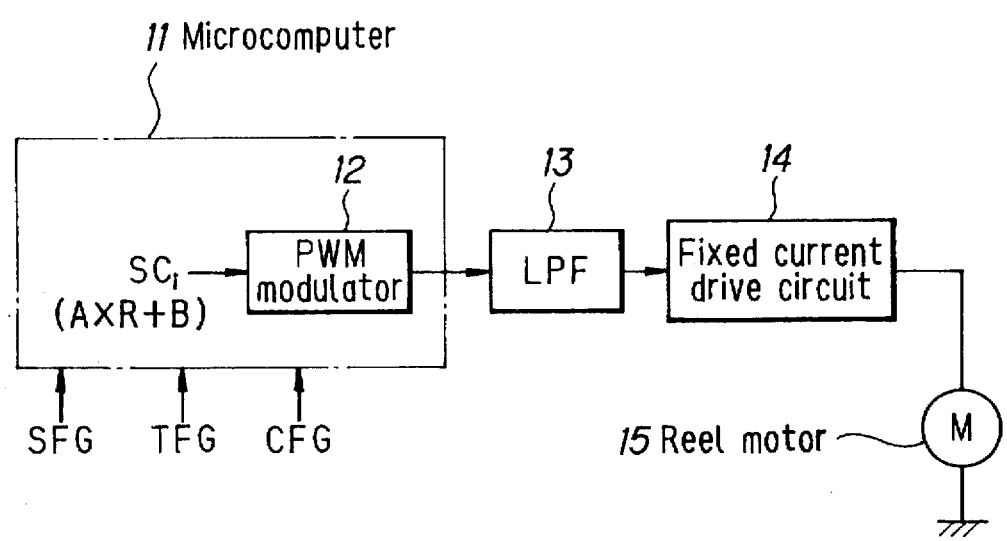
FIG. 2 is a view of a tape tension control apparatus for the prior art.
Figure 3:
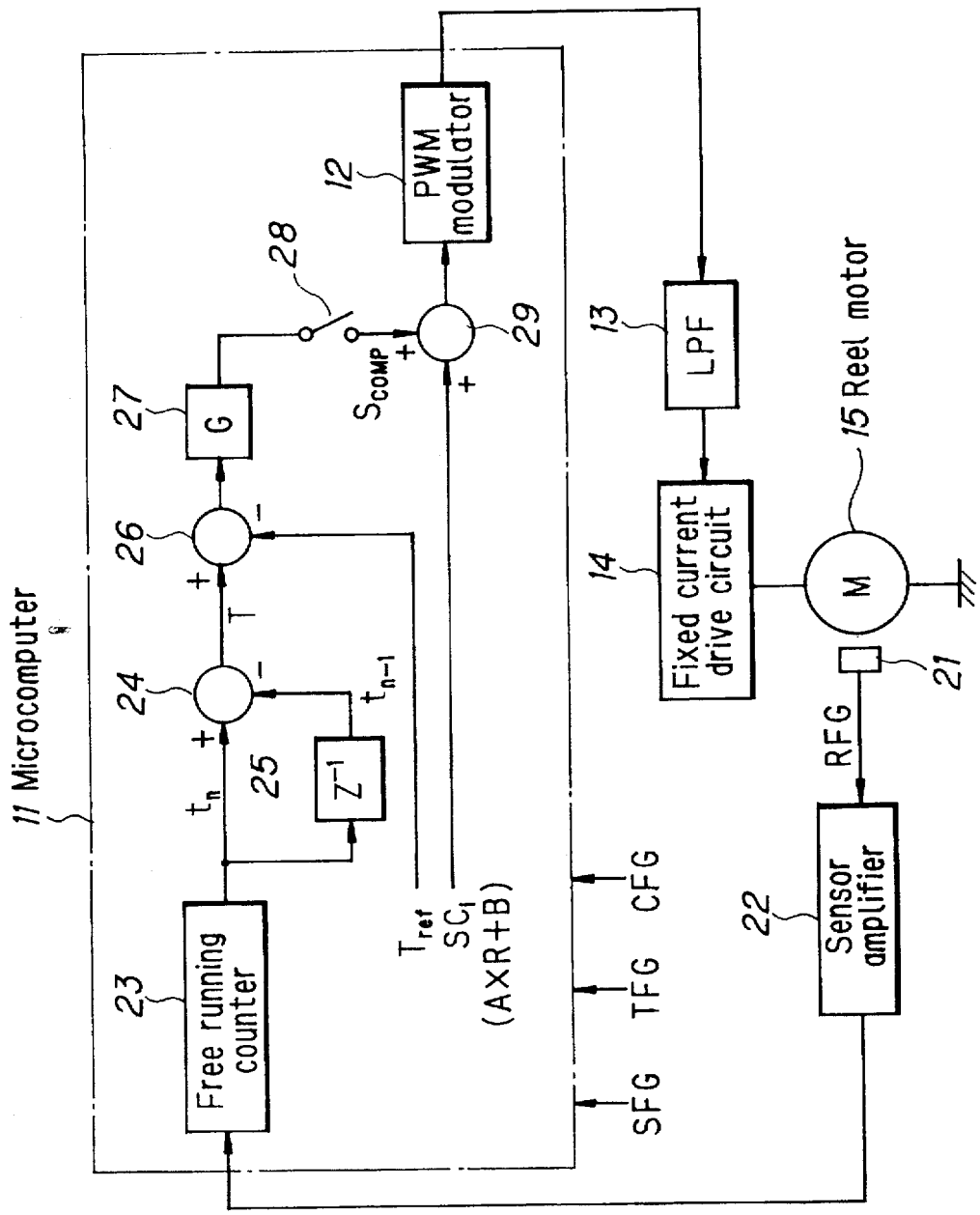
FIG. 3 is a view of the construction of a first embodiment of the tape tension control apparatus for the present invention.

The following is a description of a first embodiment of this invention with reference to FIG. 3. In FIG. 3, parts which correspond to those in FIG. 2 will be given the same numerals and will not be described in detail.

The numeral 21 indicates a frequency generator which is attached to a reel motor 15. A frequency signal RFG from the frequency generator 21 is then amplified by a sensor amplifier 22 and is then provided to the free-running counter 23 by the microcomputer 11 after having been wave shaped. Each count value is then sequentially outputted from the counter 23 on each rising part of the frequency signal RFG which has been shaped by the sensor amplifier 22.

The signal outputted from the counter 23 is sent to first subtractor 24 and a delay circuit 25, with the signal outputted from the delay circuit 25 then being inputted to the first subtractor 24. The count value $t_{n-1}$ for the previous cycle is then subtracted from the count value tn by the first subtractor 24. The count value $T=t_n-t_{n-1}$ corresponding to each cycle of the frequency signal RFG from the first subtractor 24 is taken as the rotational speed comparing means and is outputted to a second subtractor 26.

A standard count value Tref corresponding to the period of the frequency signal RFG when the reel motor 15 is rotating at the standard speed fR is provided to the subtractor 26. As the standard rotational speed can be calculated from the tape roll diameter R and the tape speed V, this ca n be expressed by equation 4.

Equation 4

$$fr = V/2 \pi R$$

The standard count value Tref is subtracted from the count T by the subtractor 26. This signal T-Tref is outputted from the second subtractor 26 as a rotational speed difference signal and is then sent to an adder 29 via an amplifier 27 having a gain G and a switch 28 to be used as an correction signal SCOMP. The value for the current I calculated in equation 2 is sent to the adder 29 as a control signal SCi. The correction signal SCOMP is then added to the control signal SCi by the adder 29 and this addition signal is sent to a PWM (Pulse Wave Modulation) circuit 12. A pulse wave modulated signal for the addition signal is then outputted from the PWM circuit 12.

The construction of this invention is as described above with items not described above having the same construction as the same items described in FIG. 2.

In this embodiment, the correction signal Scomp is added to the control signal SCi so as to adapt the current I flowing to the reel motor 15. By causing the count value T to become the same as standard count value Tref, the rotational speed of the reel motor 15 will become the same as the standard rotating speed fR. In this way, fluctuations in the speed at which the reel winds on can be controlled and variations in the tape tension F and slackening in the tape tension can be prevented.

Although not mentioned before, this changeover switch 28 is on when T is greater than or equal to Tref and is off when T is less than Tref. Also, the correction signal Scomp is only added to the control signal SCi so that the rotational speed of the reel motor 15 is controlled to become that of the standard rotational speed fR when the rotational speed of the reel motor 15 is slower than the standard rotational speed fR. In a system where the tape is driven by the capstan 6 and the pinch roller 7 (refer to FIG. 1), if the tape roll diameter R is calculated accurately and T becomes less than Tref, the rotational speed of the reel motor 15 is not faster than the standard rotational speed fR, and correction is not necessary. Also, if the rotational speed of the reel motor 15 is adapted so as to be slowed down, the amount of torque it generates is reduced along with the tape tension F and the tape will sag.

A second embodiment of the present invention will now be described with reference to FIG. 4. Parts in FIG. 4 which are also present in FIG. 3 will be given the same numerals and will not be described in detail.

The frequency signal RFG outputted by the frequency generator 21 is amplified and wave-shaped by the sensor amplifier 22 before being sent to the speed servo circuit 31 in the microcomputer 11. This speed servo circuit 31 is for controlling the rotational speed of the reel motor 15 so it becomes that of the rotational speed fR' corresponding to the tape roll diameter R. At the speed servo circuit 31 the rotational speed of the reel motor 15 is detected, and a control signal SCs for controlling the current I flowing to the reel motor 15 to make the rotational speed equal to the rotational speed fR' is outputted. This control signal SCs is then sent to the a terminal of the changeover switch 33 and the rotating speed fR' is set to be somewhat larger than the standard rotational speed fR (refer to FIG. 4).

The numeral 32 indicates the current servo circuit which fixes the tape tension F by allowing a current corresponding to the diameter R of the tape roll to flow to the reel motor 15. The calculated value of the current I (refer to equation 2) corresponding to the diameter R of the tape roll is then outputted from the current servo circuit 32 to the b terminal of the changeover switch 33 as the control signal SCi.

The signal outputted from the changeover switch 33 is sent to the PWM circuit 12, and a PWM signal corresponding to the signal outputted from the changeover switch 33 is then outputted from the PWM circuit 12. At the time of starting, the changeover switch is switched over to the "a" terminal. When the current I flowing to the reel motor 15 reduces to a current IM (refer to equation 2) which corresponds to the diameter R of the tape roll the changeover switch switches over to the "b" terminal. Whether or not the current I flowing to the reel motor has reduced to being IM can be determined, for example, by using the control signal SCs at the PWM circuit 12, so that the changeover switch can then be switched over using a control circuit from the PWM circuit 12.

Figure 1:
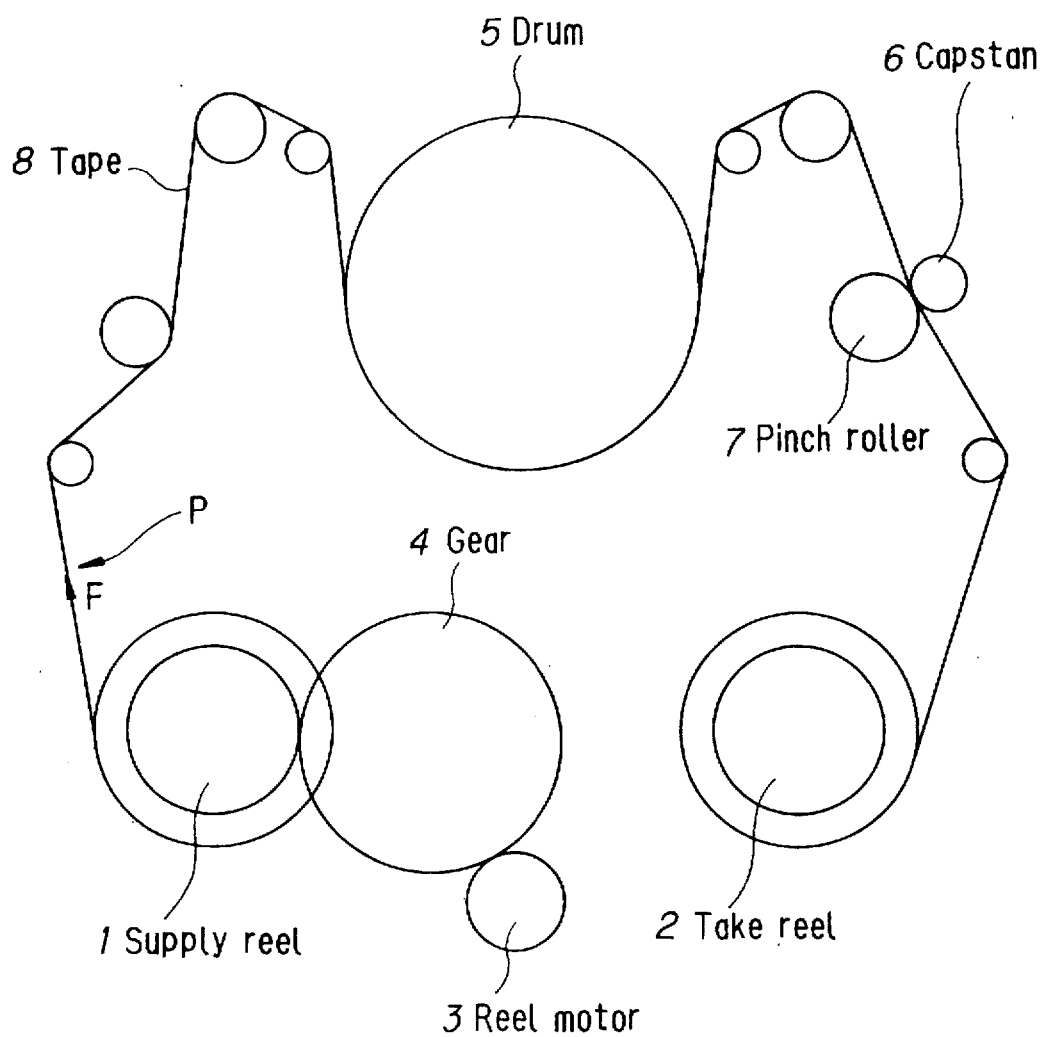
FIG. 1 is a view of an example of a conventional tape transport system with a tape loaded.

This example has a construction which is as described above, with aspects of its construction which are not described above being the same as those for the example in FIG. 1.

Figure 5:
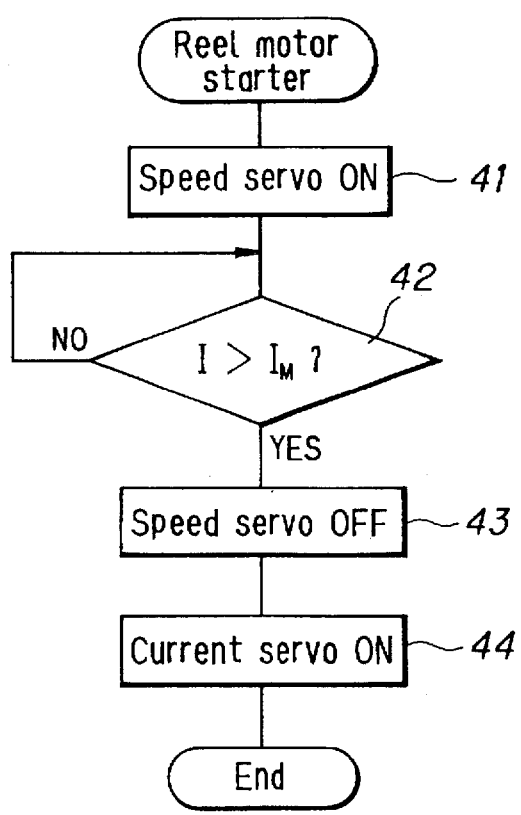
FIG. 5 is a flowchart showing the changeover operation of the servo system.

FIG. 5 is a flowchart showing the changeover operation of the servo system.

First, when the reel motor 15 starts rotating, the changeover switch 33 is switched over to the "a" terminal, and the control operation is started by the speed servo circuit 31 (step 41). It is then determined whether the current flowing to the reel motor 15 has reduced to a current IM corresponding to the diameter R of the tape roll. When the current has reduced this far, the switch is changed over to the "b" terminal, the control operation is completed by the speed servo 31 and a control operation by the current servo circuit 32 is started (steps 43 and 44).

In this example, the changeover switch 33 is switched over to the "a" terminal upon starting, and the current I flowing to the reel motor 15 is controlled so that its rotational speed provided by the speed servo circuit 31 becomes the same as the rotational speed fR'. In this way, even if the tape 8 is sagging at the start it will not be suddenly wound on. Also, subsequently the tape 8 will not sag and excessive transit tension will not be applied to the tape. This makes the starting operation for the tape smooth and increases the reliability of the tape path.

The reason the rotational speed of the reel motor 15 is adjusted to become a rotational speed fR' which is faster than the standard rotational speed fR is that if the speed is allowed to be the standard rotational speed fR, then sagging in the tape will n ever be removed.

Also, by switching the changeover switch 33 over to the "b" terminal when the current I flowing to the reel motor 15 reduces to a current IM corresponding to the tape roll diameter at this time, the flow of current I (see equation 2) corresponding to the diameter R of the tape roll flowing to the reel motor can be controlled and the tape tension F can be fixed.

Figure 4:
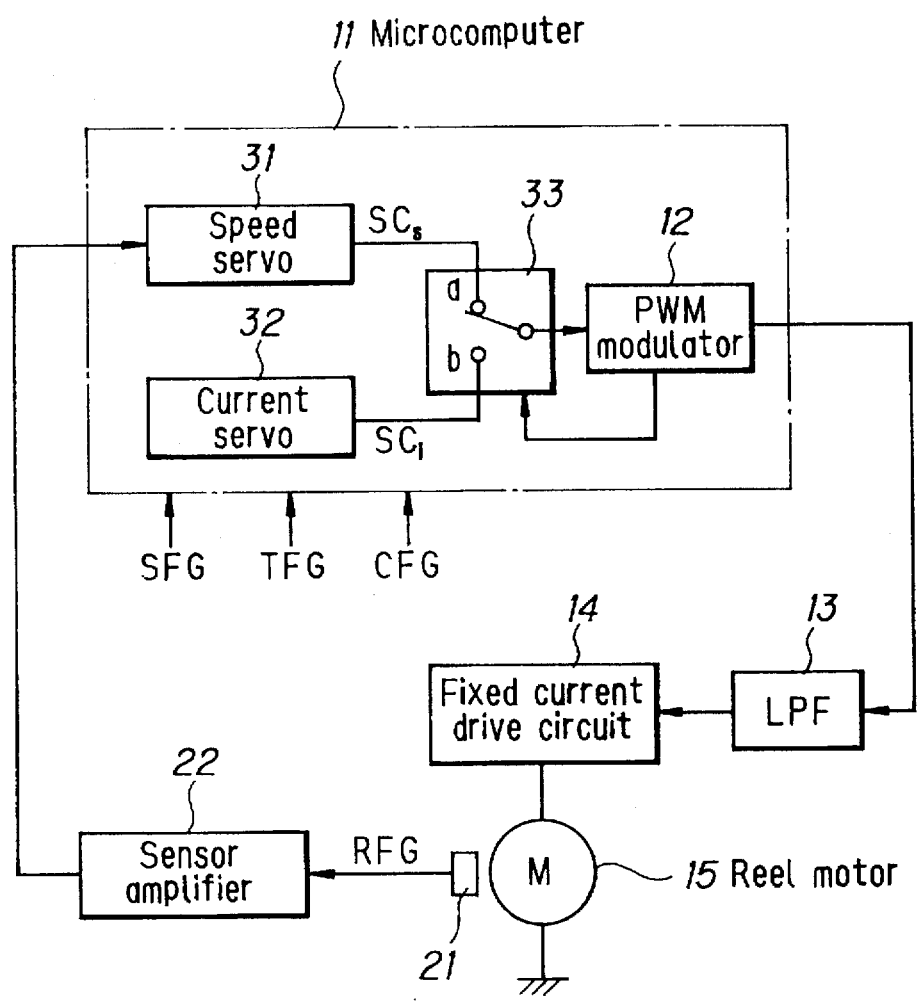
FIG. 4 is a view of the construction of a second embodiment of the tape tension control apparatus for the present inventions.

Now, the construction of the example in FIG. 4 is such that when the control operation is being carried out by the current servo circuit 32, the rotational speed of the reel motor 15 becomes the same as the standard rotational speed fR corresponding to the diameter R of the tape roll, as with the example in FIG. 3. The operating results are therefore the same as the example in FIG. 3.

FIG. 4 is a view of the construction of this second embodiment of the tape tension control apparatus for the present invention.

In FIG. 4, the frequency signal RFG outputted by the frequency generator 21 is amplified and wave-shaped by the sensor amplifier 22 before being sent to the speed servo circuit 31 in the microcomputer 11. This speed servo circuit 31 is for controlling the rotational speed of the reel motor 15 so that it becomes fixed. At the speed servo circuit 31 the rotational speed of the reel motor 15 is detected, and a control signal SCs for controlling the current I flowing to the reel motor 15 to make the rotational speed equal to the set-up value is outputted. This control signal SCs is then sent to the a terminal of the changeover switch 33.

The numeral 32 indicates the current servo circuit which fixes the tape tension F by allowing a current corresponding to the diameter R of the tape roll to flow to the reel motor 15. The calculated value of the current I (refer to equation 2) corresponding to the diameter R of the tape roll is then outputted from the current servo circuit 32 to the b terminal of the changeover switch 33 as the control signal SCi.

The changeover switch 33 is switched over to the "b" terminal when control is carried out to provide a fixed tape tension F in the reverse system and is switched over to the "a" terminal when it is determined that the torque loss is abnormal. The signal is then outputted from the changeover switch 33 to the PWM modulating circuit 12, from which a corresponding PWM signal is outputted.

This example has a construction which is as described above, with aspects of its construction which are not described above being the same as those for the example in FIG. 2.

In this example, by having the changeover switch 33 switched over to the "b" terminal when the tape tension F in the reverse system is controlled so as to be fixed, control may be carried out by allowing a current I (see equation 2) corresponding to the tape reel diameter R to flow to the reel motor 15 so that the tape tension F can be fixed in the same way as the example in FIG. 2.

Figure 6:
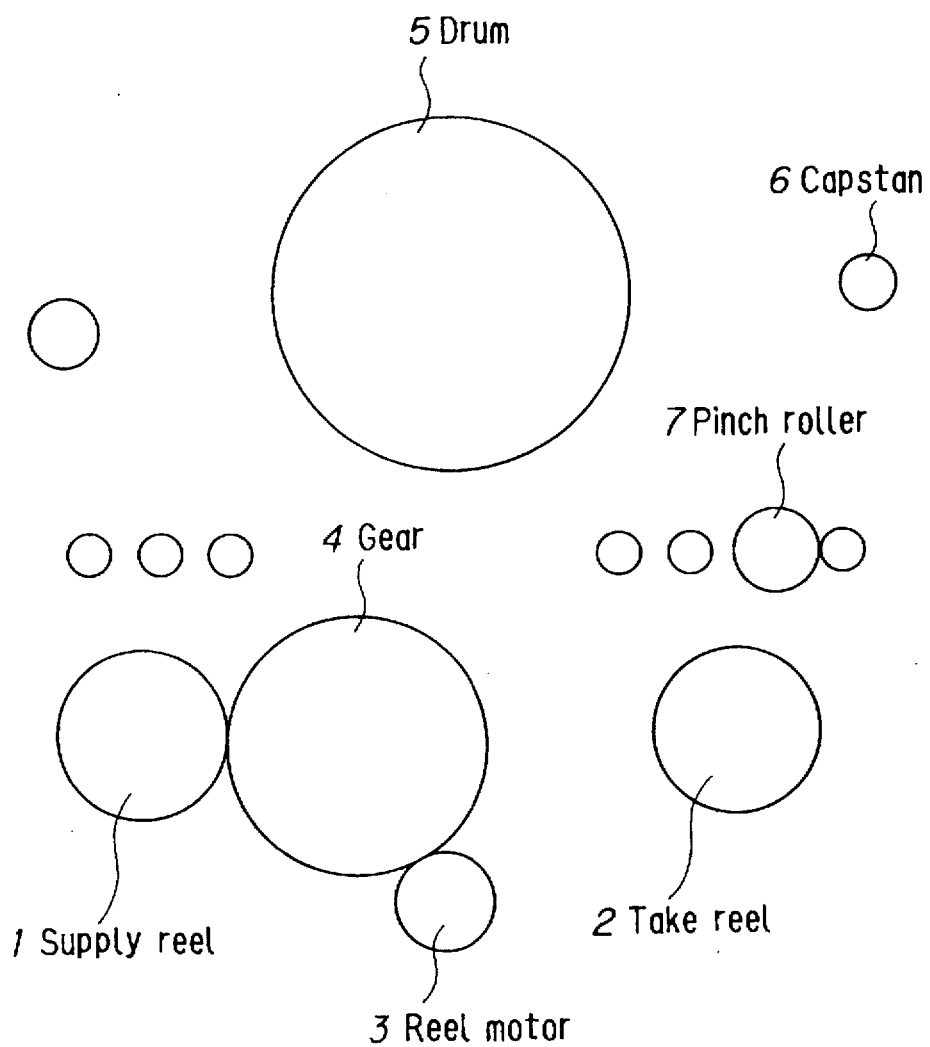
FIG. 6 is a view of a tape transport system without a tape loaded.

By switching the changeover switch 33 over to the "a" terminal when an abnormality in the torque loss is determined, the reel motor 15 can be controlled so as to rotate at a fixed rotational speed. When, as is shown in FIG. 6, there is no tape present, that is, it is unloaded, the reel motor 3 is rotating in an anti-clockwise direction. Parts of FIG. 6 which correspond to parts in FIG. 1 are given the same numerals.

Under these conditions, in order that the control signal SCs corresponds to the current I flowing to the reel motor 15, a current MIs is detected by the control signal SCs. This kind of detection current MIs is proportional to torque loss MTs which is the sum of the torque loss RL for the reel motor 3, the torque loss KL for the toggling gear and the torque loss SL for the supply reel 1 (refer to equation 4a).

$$MTs = KL + RL + TL \times \mu \times MIs \qquad (4a)$$

When the constants A and B (see equation 2) occurring, for example, on a production line are used, comparisons can be made with the current MIs detected under the same conditions. In this way it is possible to know how the torque loss MTs changes with time so that abnormalities in this torque loss MTs can be detected.

When the current MIs detected in the above way is outside the range MIsr−Δia to MIsr+Δia, i.e. when, for example, tape damage occurs due to the tape tension F being outside the range of the target value while control to fix the tape tension F by calculating the current I which corresponds to the tape roll diameter I in equation 2, the torque loss MTs is determined to be abnormal.

Figure 7:
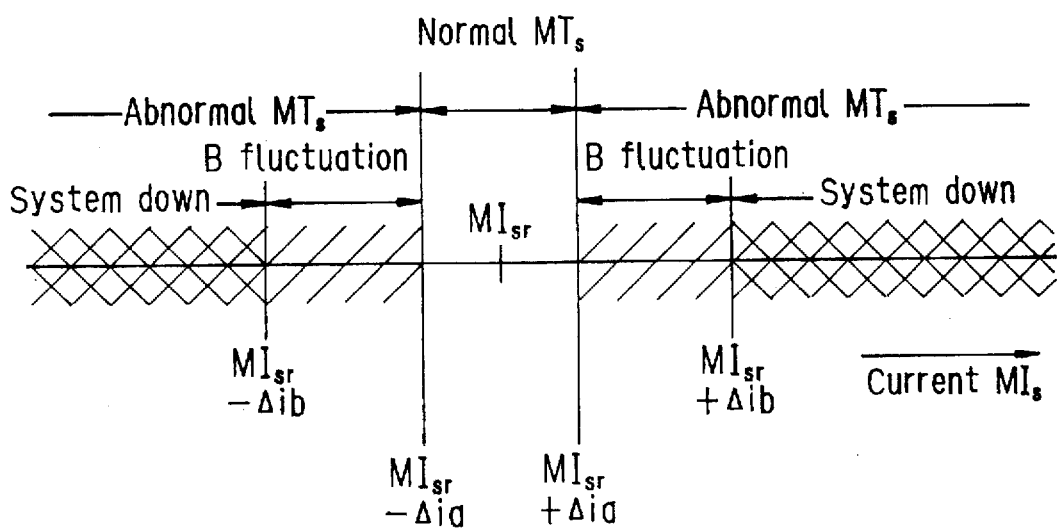
FIG. 7 is a schematic view of the determination of abnormalities in the torque loss.

When the current MIs is only slightly shifted from the current MIsr and the torque loss changes only a little with time, the constant B in equation 2 can be re-assigned in accordance with the size and direction of the shift so as to adjust the tape tension F towards the target value. A large shift and a substantial change in the torque loss MTs over time will, however, cause a video system to crash, i.e. when (MIsr−Δib)≦MIs<(MIsr−Δia) and (MIsr+Δia)<MIs≦(MIsr+Δib), the constant B is reset, and when MIs<(MIsr−Δib) and (MIsr+Δib)<MIs, a VTR will crash (see FIG. 7). If the VTR crashes, methods of prohibiting the recording and playback operations and the insertion of tape cassettes has to be considered. In this case a visual or audio warning may be issued.

In this embodiment it is preferable to be able to identify abnormalities due to changes in the torque loss MTs with time. Also, if the changes in the torque loss with time are small, the constant B in equation 2 is reset and a current I corresponding to the tape roll diameter R in the equation 2 is calculated. In this way, the tape tension F can be kept at the target value even if the torque loss varies with time while the tape tension is being controlled to be a constant. As the VTR system will crash if the variation in the torque loss with time is large, tape damage, for example, caused by abnormalities in the torque loss MTs, can be avoided.

In the embodiment described above, attention was paid to the supply reel, but abnormalities can also be discerned in the torque loss $MT_t$ for the take reel in the same way. That is when there is no tape present (the VTR is unloaded) the reel motor 3 can be made to rotate in the clockwise direction.

Under these conditions, as the control signal SCs corresponds to the current flowing to the reel motor 3, it can be used to detect the current MIt. The current MIt detected in this way is then directly proportional to the torque loss MTt calculated from the torque loss RL for the reel motor 3, the torque loss KL for the gear 4 and the torque loss TL for the take reel 2 (see equation 5).

Equation 5

$$MTt = KL + RL + TL \times \mu \times MIt$$

By then making a comparison with a current MItr detected under the same conditions on, for example, a production line, the change in the torque loss MTt with time can be known, and abnormalities in the torque loss MTt can be determined.

For example, when the current MIt detected in the way described above is outside the range MItr−Δia to MItr+Δia, i.e., when, for example, the tape is damaged as a result of changes in the torque loss MTt, then the loss torque MTt is abnormal. Also, when it is determined in this way that the torque loss MTt is abnormal, the system will crash so that tape damage may be avoided.

Figure 8:
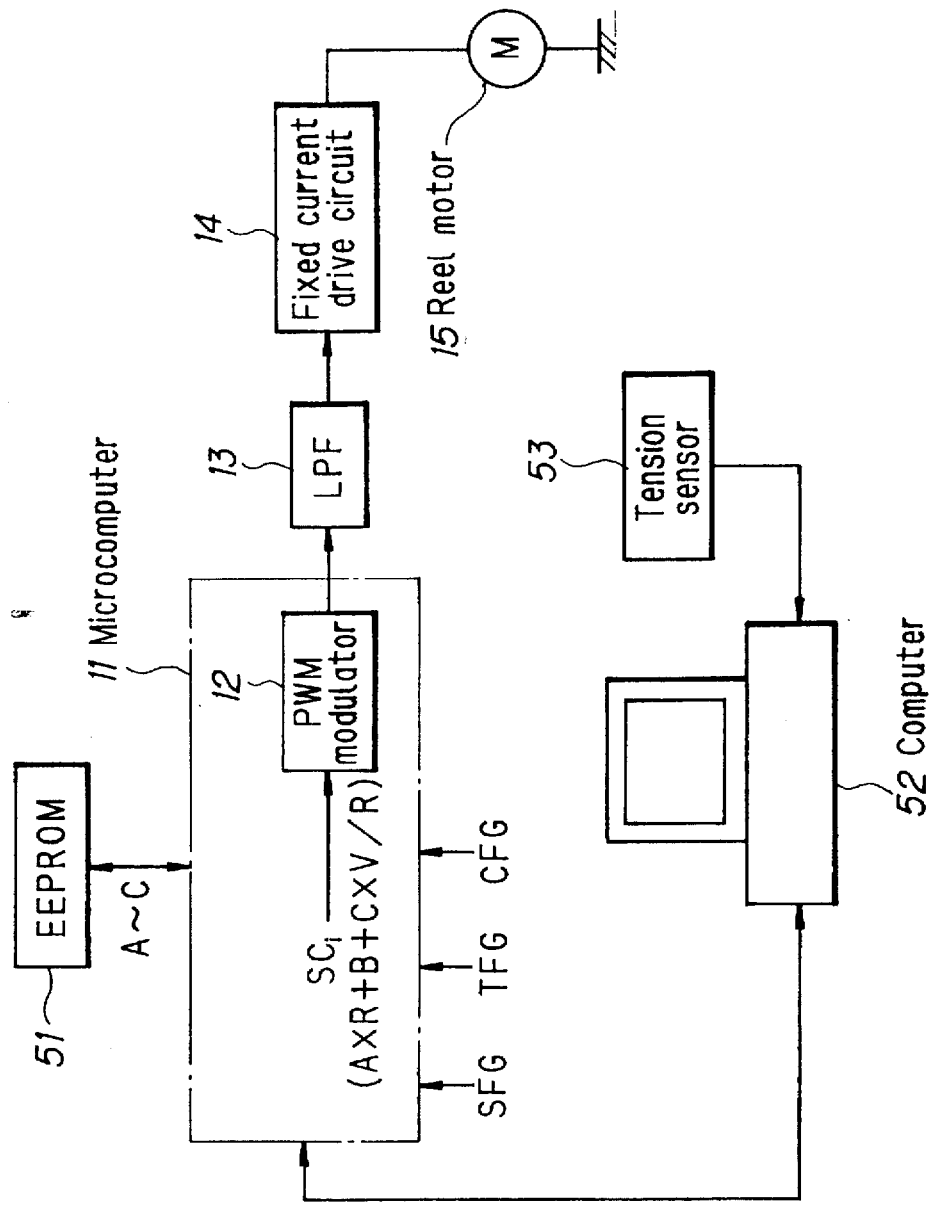
FIG. 8 is a view of a tape tension control apparatus which keeps the tape tension constant without requiring a ROM with a large storage capacity.
Figure 9:
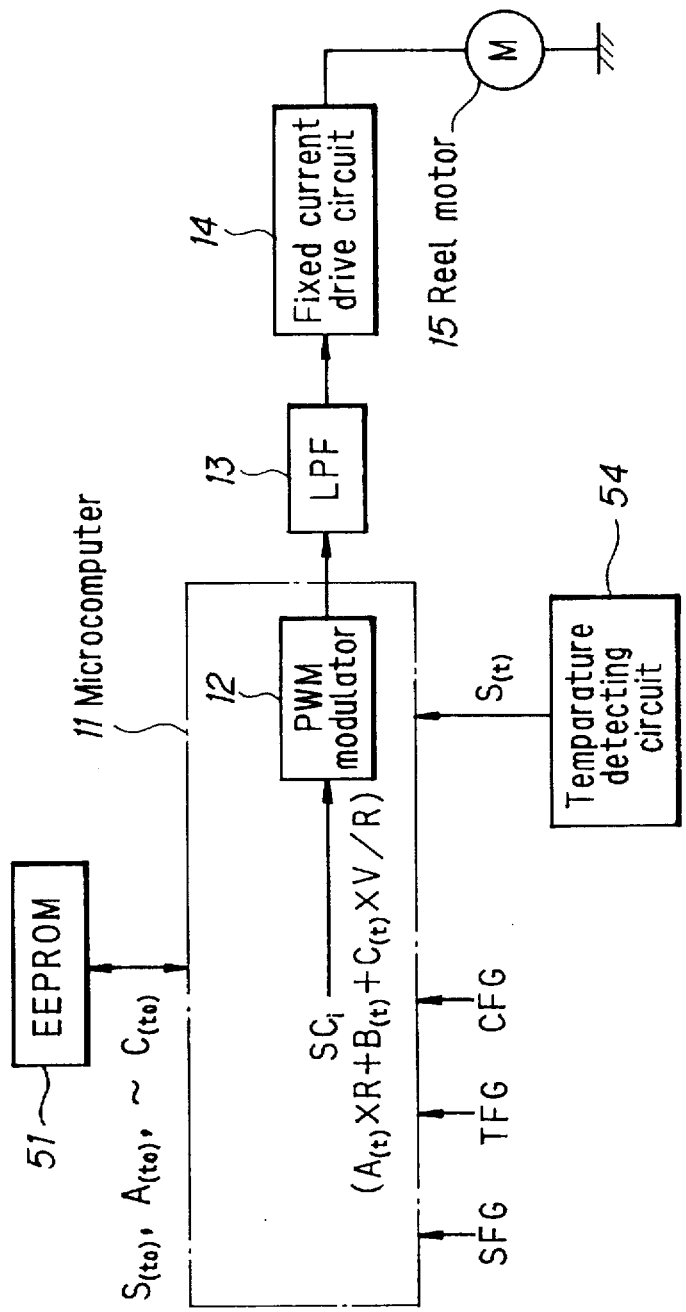
FIG. 9 is a view of a third embodiment of the present invention which will provide a constant tape tension.

FIGS. 8 and 9 show a tape tension control apparatus which evens out fluctuations on every setting so as to keep the tape tension constant and which does not require a ROM with a large storage capacity.

Equation 2 shows the relationship between the current and the generated torque of the motor taking into consideration mechanical and electrical loss. However, in reality, for any mechanical losses, fixed losses due to electrical losses, or losses due to fluctuations which are directly proportional to the speed of the motor, the approximation equation 5a can be used. Here, V represents the tape speed, K1 to K3 and A to C represent constants, A=K1×F, B=K2 and C=K3/2 π. Mechanical losses include losses such as reel motor losses, losses for the gear transmitting the driving power to the reels from the reel motor and reel losses, while electrical losses include losses such as errors in the current detection circuit. The fluctuation losses are mainly due to eddy current losses in the reel motor 15.

$$I = K1 \times F \times R + K2 + K3 \times V/2\pi R \qquad \text{Equation 5a}$$
$$= A \times R + B + C \times V/R$$

In FIG. 8, the numeral 51 indicates the EEPROM which acts as the non-volatile memory for storing the constants A to C for the approximation equation 5a. This EEPROM 51 can be adjusted on the production line so as to store the most suitable setting for each of the constants A to C.

The constants A to C stored in the ROM 51 are adjusted on the production line by computer in the following way.

[step 1]

First, the top of the tape 8 is mounted onto the tape transport and is transported in a low speed mode (for example, ×1). The current I flowing to the reel motor 15 is then adjusted by the computer 52 by changing the control signal SCi provided to the PWM circuit 12 so as to get the most suitable value for the tape tension F. In this case, the tape tension F is then detected by a conventional tension sensor 53 and this detection information is sent to the computer 52. The current flowing when the most suitable value for the tape tension F is found is then taken to be I1, the tape roll diameter at this time is taken to be R1 and the tape speed is taken to be V1, so that the relationship in equation 6 can be satisfied.

Equation 6

$$I_1 = A \times R_1 + B + C \times V_1/R_1$$

[step 2]

Next, the end of the tape 8 is mounted onto the tape transport and is transported in a low speed mode (for example, x1). The current I flowing to the reel motor 15 is then adjusted by the computer 52 by changing the control signal SCi provided to the PWM circuit 12 so as to get the most suitable value for the tape tension F. The current flowing when the most suitable value for the tape tension F is found is then taken to be I2, the tape roll diameter at this time is taken to be R2 and the tape speed is taken to be V2, so that the relationship in equation 7 can be satisfied.

Equation 7

$$I_2 = A \times R_2 + B + C \times V_2/R_2$$

As the tape speeds V1 and V2 at the top of the tape and at the end of the tape can be considered to be the same, it is assumed at the computer 52 that V1=V2 which is approximately equal to zero, so that the constants A and B can be calculated using equations 6 and 7.

[step 3]

Next, the top and the end of the tape 8 are mounted onto the tape transport (the reel motor is rotating quickly) and they are transported in a high speed mode (for example, x75). The current I flowing to the reel motor 15 is then adjusted by the computer 52 by changing the control signal SCi provided to the PWM circuit 12 so as to get the most suitable value for the tape tension F. In this case, the computer 52, using the constants A and B calculated in step 2, calculates the current I using equation 2 while varying the constant C and sends this calculated value to the PWM circuit 12 as a control signal SCi. The constant C is then given the value which gives the most suitable tape tension F.

The constants A to C which are obtained in the process in steps 1 to 3 are then written into the ROm 51 by the computer 52 via the microcomputer 11. The computer 52 is then separated from the microcomputer 11 after the constants A to C have been written into the ROM 51.

During setting, the microcomputer 11 reads out the constants A to C which were written into the ROM 51 during the aforementioned adjustment. The current I is calculated from equation 2 and this calculated value is sent to the PWM circuit 12 as a control signal SCi. A PWM signal corresponding to the control signal SCi is then outputted from the PWM circuit 12 to a low pass filter 13, where it is smoothed before being sent to the fixed current drive circuit 14. In this way, a current I corresponding to the tape reel diameter R flows to the reel motor 15 which drives the supply reel 1 in such a manner that the tape tension F is kept constant.

In this example, the most suitable constants for the approximation equation are set into the ROM 51 each time, and a current I corresponding to the tape roll diameter is calculated using these values for the constants A to C during setting. Fluctuations during setting may therefore be completely corrected so that the tape tension F may be kept constant. Also, as the current I corresponding to the tape roll diameter R is calculated within the microcomputer from equation 2, a ROM look-up table is not used and so a ROM having a large storage capacity is not necessary.

In the example in FIG. 8, the constants A to C are obtained during adjustments carried out on the production line and stored in the ROM 51. These are then read out from the ROM 51 and used without modification.

However, although these constants A to C have been set to be the most suitable under the temperature conditions at the time of adjusting, they may not be the most suitable under the temperature conditions during the setting at the time of use.

Third Embodiment

FIG. 9 is a view of a further embodiment of the present invention which will provide a constant tape tension F regardless of the temperature conditions for setting at the time of use. In FIG. 9, parts which correspond to parts in FIG. 8 will be given the same numerals and will not be described in detail.

In this diagram, the numeral 54 represents the temperature detecting circuit made up of, for example, a thyristor for detecting the temperature conditions, and the temperature information S(t) which describes these temperature conditions t is sent from the temperature detecting circuit 54 to the microcomputer 11.

In this embodiment, the constants A to C are written into the ROM 51 during adjustment on the production line along with temperature information S(t0) indicating the temperature conditions tO during adjustment.

Assuming a relationship with the temperature conditions t the constants A, B and C are made to be A(t), B(t) and C(t). The approximation equation 6 can then be deduced by comparing the respective trends of the constants from the data. The constants A and B are, on the whole, not temperature dependent, while the constant C can be approximated to the second temperature function. In equation 8, A(t0) B(t0) and C(t0) are the constants written into the ROM 21 during adjustment and K is a fixed constant which can be obtained from the data.

Equation 8

$$A_{(t)} = A_{(t0)}$$

$$B_{(t)} = B_{(t0)}$$

$$C_{(t)} = C_{(t0)} + K_{(t2-t0 2)}$$

During setting the microcomputer 11 reads the constants A(t0), B(t0) and C(t0) out from the ROM 51 along with the temperature information S(t0) which indicates the temperature conditions during adjustment, and calculates the temperature corrected constants A(t), B(t) and C(t). The constants A(t), B(t) and C(t) are then used for the constants A, B and C in equation 2, a current I corresponding to the tape roll diameter R is calculated, and this calculated value is sent to the PWM circuit as a control signal SCi.

What is claimed is:

1. A tape driving apparatus for driving a tape type recording medium extending between and wound around a pair of tape reels comprising:

a reel motor including an output shaft;

a capstan for stabilizing a transport speed of the tape type recording medium;

diameter calculating means for calculating a diameter of the tape type recording medium wound around one of said pair of tape reels which is engaged with said output shaft of said reel motor from a capstan pulse signal and from a pair of tape reel pulse signals;

control signal generating means for generating a control signal which is a function of the calculated diameter of the tape type recording medium wound around said one tape reel;

rotation speed detecting means for detecting a rotation speed of said reel motor so as to generate a reel motor rotation speed detection signal including:

a shaft rotation sensor;

a free running counter for generating a count value by timing an interval between signals from said shaft rotation sensor;

delay means for delaying a first output from said free running counter; and first subtracting means for subtracting an output of said delay means corresponding to an immediately previous count value from a next successive output from said counter corresponding to a current count value to produce said reel motor rotation speed detection signal;

reel motor rotation speed reference signal generating means for generating a reel motor rotation speed reference signal indicative of a reference speed which is a function of said diameter of the tape wound around said one tape reel;

second subtracting means for subtracting said reel motor rotation speed reference signal from said reel motor rotation speed detection signal to produce a compensation signal;

adding means for adding said compensation signal to said control signal only when said reel motor rotation speed reference signal is larger than said reel motor rotation speed detection signal to create a compensated control signal; and reel motor driving means for driving said reel motor with a signal that is a function of said compensated control signal, whereby said rotation speed is made to approach said reference speed and a tension imposed upon the tape type recording medium is controlled.

\* \* \* \* \*